June 1, 1937.  L. H. MOOMAW  2,082,505
MOTION PICTURE CAMERA
Filed Sept. 29, 1933  4 Sheets-Sheet 1
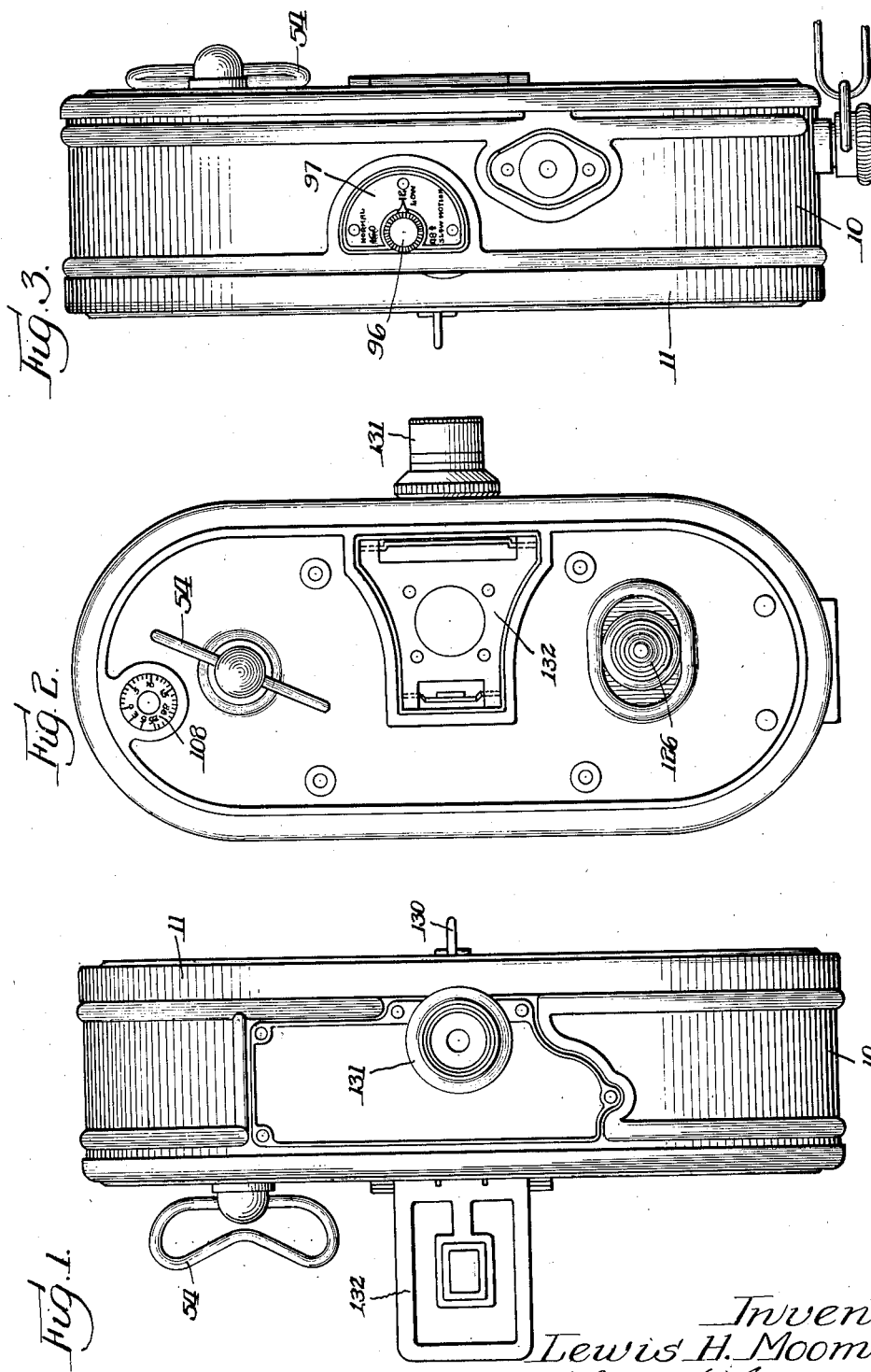
Inventor:-
Lewis H. Moomaw June 1, 1937. L. H. MOOMAW 2,082,505
MOTION PICTURE CAMERA
Filed Sept. 29, 1933 4 Sheets-Sheet 2

Inventor
Lewis H. Moomaw

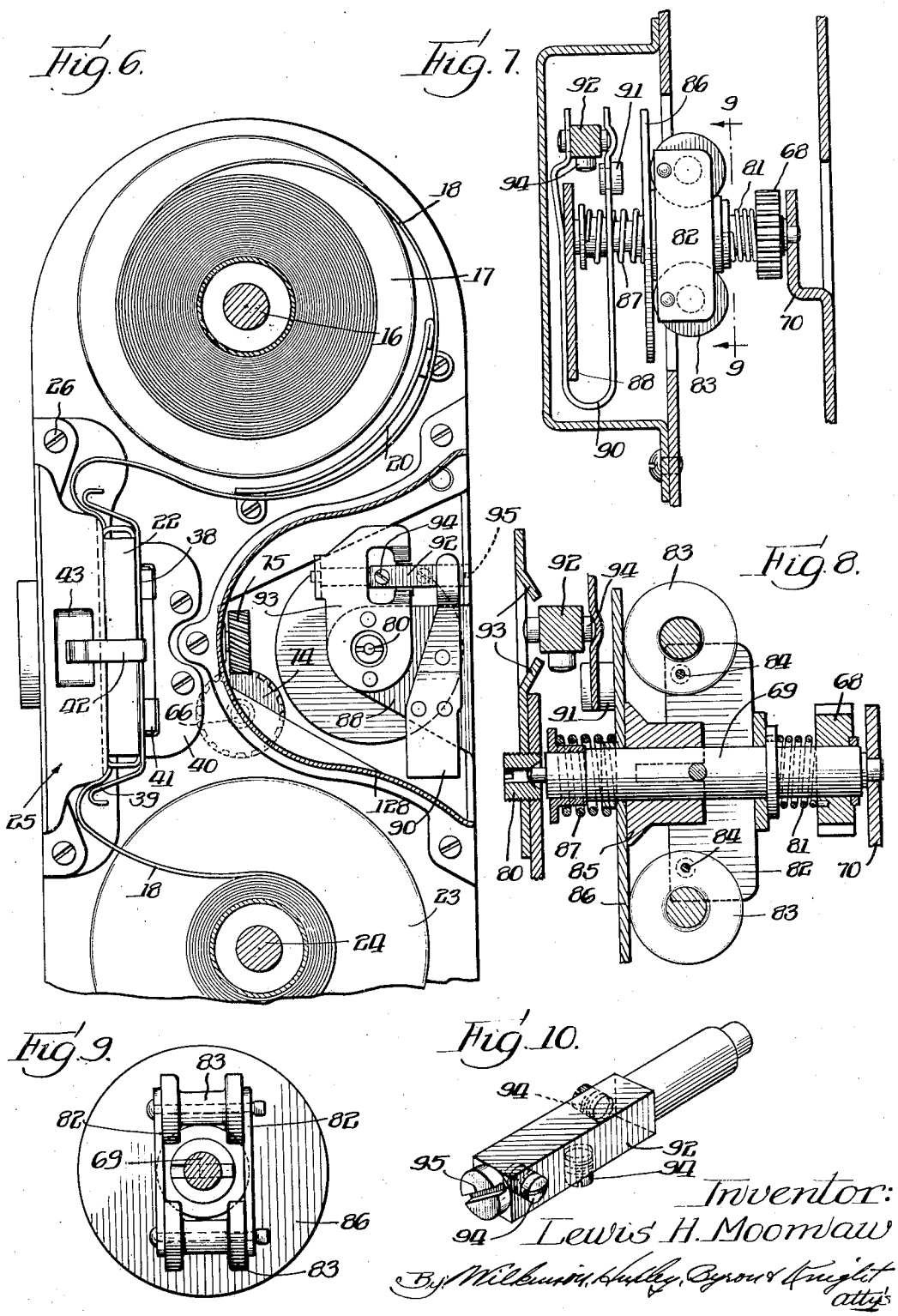

June 1, 1937.  L. H. MOOMAW  2,082,505
MOTION PICTURE CAMERA
Filed Sept. 29, 1933  4 Sheets-Sheet 4
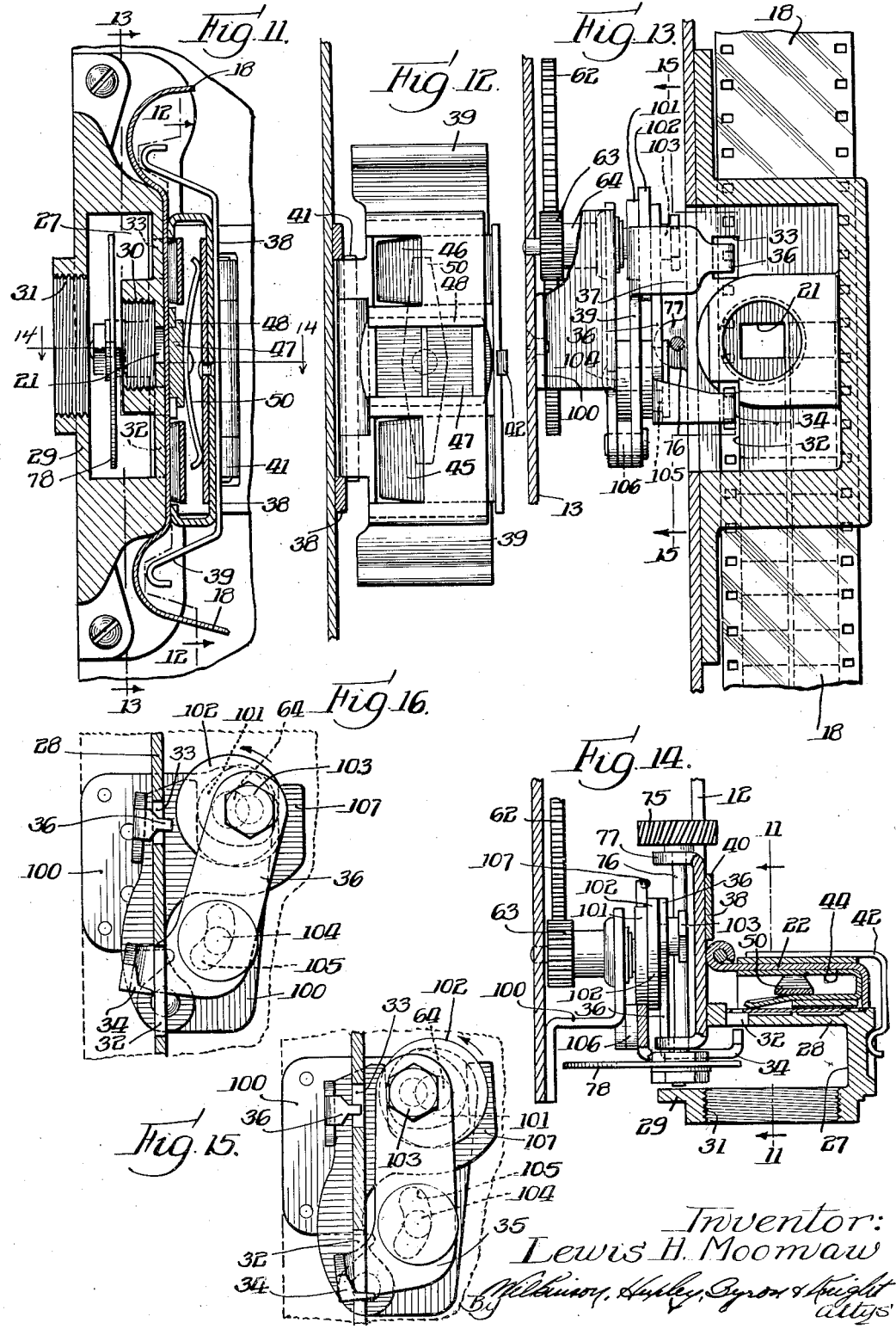
Inventor:
Lewis H. Moomaw Patented June 1, 1937

2,082,505

UNITED STATES PATENT OFFICE 2,082,505

MOTION PICTURE CAMERA

Lewis H. Moomaw, Wilmette, Ill., assignor to Keystone Mfg. Co., Boston, Mass., a corporation of Massachusetts Application September 29, 1933, Serial No. 691,438

10 Claims. (Cl. 88—17)

The invention relates to motion picture cameras with more particular reference to cameras especially designed for use by amateurs in taking pictures on a sixteen milli-meter film.

The primary object of the invention is to provide a camera having an exposure aperture one-fourth the size of the frame heretofore exposed on sixteen milli-meter films. Accordingly, the aperture of the present camera is eight milli-meters in height and therefore the camera is capable of making four exposures on one frame, the two exposures on one-half of the frame being made in the first run of the film through the camera which is again exposed to make pictures on the other half thereof.

Among the objects of the invention is to produce a camera of the class described which will be compact and light in weight due to extreme simplicity in construction, in which the operating parts will be accessible, making for convenience in the assembly of the camera and which will be efficient in operation.

Another object of the invention resides in the provision of a film feeding assembly of novel construction including a film gate having a plurality of pressure pads to maintain pressure on the film passing therethrough, whereby the film is held against the exposure aperture and in contact with the intermittent film feeding means.

Another object is to provide a film guard which will maintain sufficient slack in the film strip leading from the feeding spool to remove the usual strains or load from the film feeding mechanism.

A further object is to provide improved film feeding mechanism consisting of a feeding claw for advancing the film past the aperture in combination with a pilot pin for holding the film in position during exposure thereof and while the claw is out of engagement.

A further object is to provide ratchet mechanism for the spring motor characterized by the omission of the usual tension spring and which will be practically noiseless in operation.

Another object is to provide an indicator to indicate to the operator the progress made in the unwinding of the film from the delivery reel and thus the quantity of unexposed film remaining on the reel.

Still another object of the invention is the provision of an improved governor for regulating the speed of the spring driven mechanism and having several positions of adjustment to vary the number of exposures in any given unit of time.

The general construction of the camera contemplated by this invention comprises a casing or housing divided by a partition forming part of the frame carrying the camera mechanism. The motor and its associated gears for controlling the movement of the film through the camera and the operation of the shutter are disposed to one side of the partition while the film reels, the exposure aperture and film gate are located to the other side of the partition. In accordance with the invention substantially all the parts including the gears are of stamped metal and as will be appreciated from the following description the camera when constructed in this manner can be manufactured at a very small cost.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a front elevation of the casing for housing the camera of the invention;

Figure 2 is a view in elevation of the casing showing in detail the view finder attached thereto, the handle for winding the spring motor and the film footage indicator;

Figure 3 is a rear elevational view of the casing showing the adjustment for regulating the speed of the camera mechanism;

Figure 6 is a front elevational view of that side of the camera which is rendered visible when the cover of the casing and the cover over the governor are removed;

Figure 7 is a detail sectional view of the governor for regulating the speed of the camera mechanism;

Figure 8 is an enlarged vertical sectional view of the governor which can be considered as taken to one side of the supporting shaft therefor;

Figure 9 is a sectional view taken along line 9—9 of Figure 7;

Figure 10 is an enlarged perspective view showing the adjusting shaft for the governor;

Figure 11 is a fragmentary vertical sectional view showing in detail the film gate and lens aperture, said view being taken substantially on line 11—11 of Figure 14;

Figure 12 is a sectional view taken on line 12—12 of Figure 11;

Figure 13 is a sectional view taken on line 13—13 of Figure 11;

Figure 14 is a longitudinal sectional view showing the film gate, lens aperture and film feeding mechanism;

Figure 15 is a detail view of the film feeding mechanism as viewed on line 15—15 of Figure 13 and looking in the direction of the arrows; and Figure 16 is a view similar to Figure 15 but showing the film feeding mechanism in another position of operation.

Figure 5:
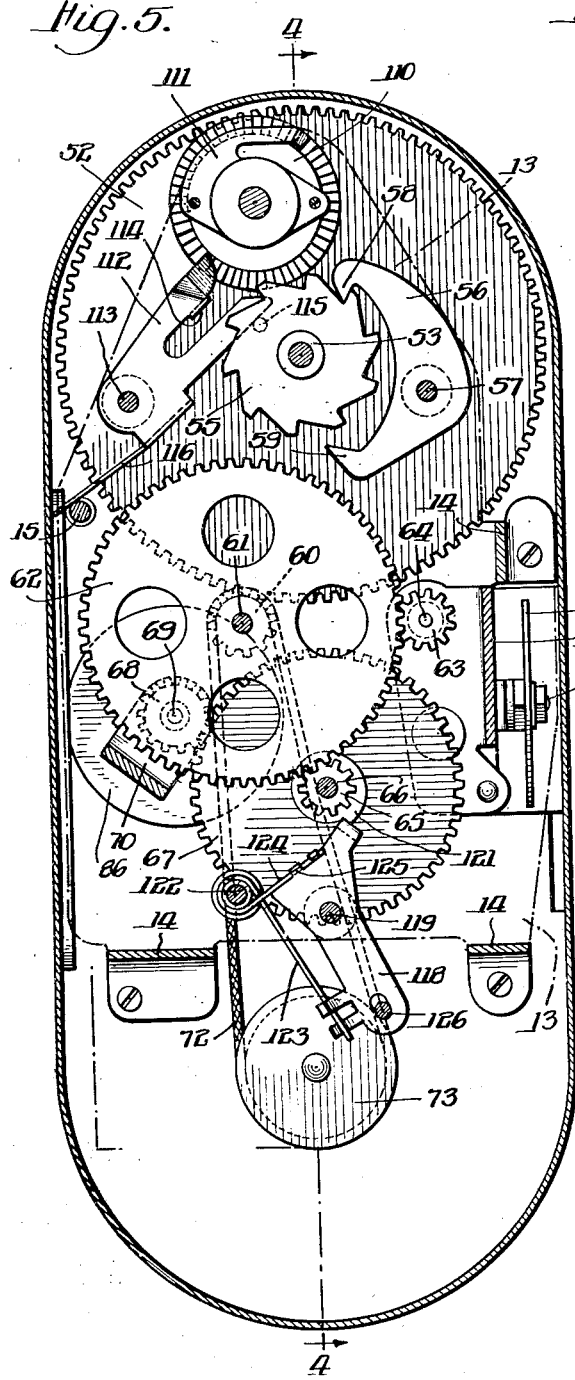
Figure 5 is a longitudinal sectional view taken substantially along line 5—5 of Figure 4 and showing in detail the gearing for driving the mechanism of the camera.

As more particularly described in the invention and as herein illustrated the casing or housing 10 having a cover 11 houses a pair of spaced frame members 12 and 13, the former being located substantially centrally of the casing forming a dividing partition, while the frame member 13 is secured in spaced relation to the partition by supports 14 formed integral with the member and by the supporting stud 15. To that side of the dividing partition 12 adjacent the cover 11 extends the stud shaft 16 for supporting a film reel 17 having film 18 wound thereon. The film in unwinding from reel 17 passes on the outside of a film guard 20 suitably secured to partition 12 and which guard therefore effectively maintains a proper film loop between the unwinding reel and the film gate 22 to provide slack in the film strip thus relieving the feeding mechanism of the usual loads and strains. Mechanism to be described intermittently feeds the film across the exposure aperture whereupon the film discharged from the film gate is wound upon the film reel 23 supported on and rotated by the driven shaft 24 mounted for rotation by partition 12.

The member 25 associated with the film gate 22 is suitably secured to partition 12 by screws 26 and is provided with a recess 27 forming a film supporting wall 28 and an integral outer wall 29, the former having its exterior surface positioned for contact with the film gate and having the exposure aperture located therein. This wall is also provided with a boss within the recess 27 and which is apertured and threaded at 30 for positioning a lens in alignment with the exposure aperture which is also the reason for the threading of the opening 31 in wall 29. Openings 32 and 33, Figure 13, are formed in the supporting wall 28 for receiving the claw 34 of the pitman arm 35 and the pilot pin 36 of the arm 37, respectively, which engage the perforations in the film 18 for advancing the film with respect to the exposure aperture and for holding the film in position during exposure. Gate 22 has secured thereto the resilient member 38 having the ends 39 bent as shown and which are located between the film gate and the respective reels for yieldingly engaging the film.

The plate 40, suitably secured to partition 12, provides the hinges 41 for mounting the film gate to the partition, the gate when open permitting location of the film over the exposure aperture and being locked in closed position when the film is thus located by the spring clip 42 which engages recess 43 formed on member 25. The gate 22 is formed by bending member 22 to provide spaced walls within which is confined a strip of spring metal 44, Figures 11 and 14, bent upon itself and having one leg suitably secured to the film gate while ends formed on the free leg project through spaced apertures in the inner wall of the film gate providing pressure pads 45 and 46, respectively. The pressure pad 45 is located to the side of aperture 32 when the film gate is closed, while pad 46, which exerts slightly greater pressure than its companion pad, is disposed to the side of aperture 33. It will be seen that when the film is located between the exposure aperture 21 and the film gate that the same will be maintained for engagement with the film feeding claw 34 by reason of the pressure pad 45 and for engagement with the pilot pin by the pad 46. A central pressure pad 47 is held within a slot formed within the inner wall of the film gate by the shoulders 48 and spring clip 50. The clip has location between the legs of the bent strip 44 and engages the base leg to force the pressure pad 47 outwardly of the inner wall of the film gate. With the film gate closed the pad 47 therefore applies a slight pressure on the film in the vicinity of the exposure aperture 21.

Figure 4:
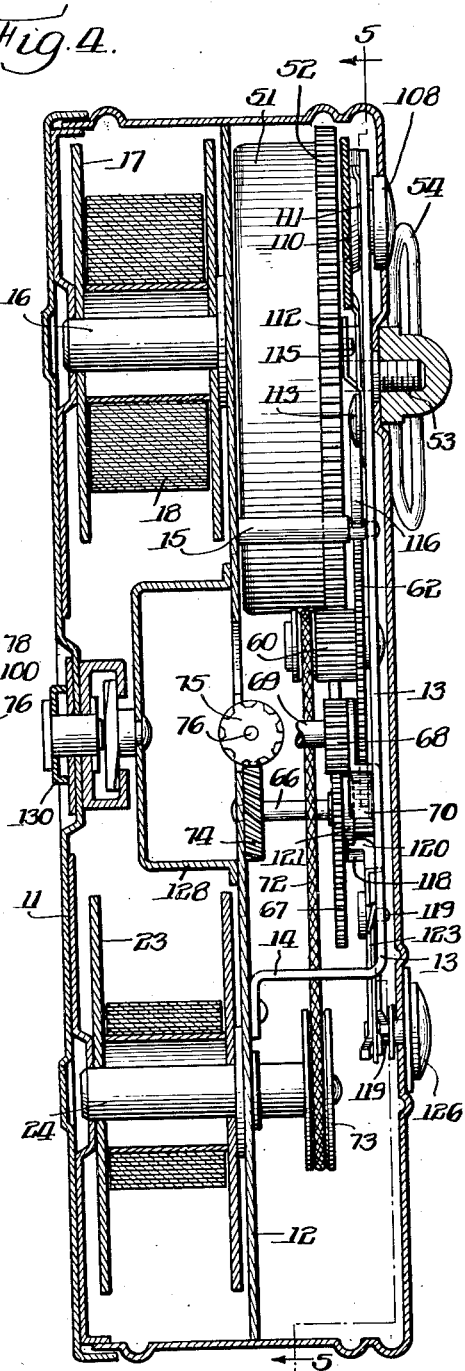
Figure 4 is a sectional view which may be considered as taken substantially on the longitudinal center line of the camera as shown in Figures 2 and 5.

The motor used in operating the present camera comprises a spring type motor shown as mounted in one end of the motor compartment, Figure 4, and includes drum 51 having the gear 52 fixed thereto and rotatably mounted on the motor shaft 53 journalled in the spaced frame member. The outer end of the shaft is threaded for receiving the handle 54 by which a convolute spring housed within drum 51 is wound, it being understood that one end of this spring is secured to the shaft while the other end is secured to the drum. The invention provides escapement mechanism permitting rotation of shaft 53 in one direction, that is, to wind the convolute spring but locking the shaft against rotation in the opposite direction and which includes a ratchet wheel 55 fixedly secured to shaft 53 and an arcuate pawl 56 pivoted at 57 to frame member 13. As will be clearly seen in Figure 5 the pawl is provided with a pointed end 58 directed inwardly and a pointed end 59 pointed outwardly and disposed with respect to the ratchet wheel so that an end is alternately and automatically located within the path of a ratchet. The ratchet and escapement pawl allows the operator to wind the motor by turning the handle 54, it being understood that any rotation of shaft 53 in an opposite direction caused by the tension of the convolute spring will be prevented by the pawl 56. Rotation of drum 51 and thus gear 52 will impart rotation to pinion 60 fixed to shaft 61 which also carries a gear wheel 62. This gear in turn meshes with a pinion 63 fixed to shaft 64 which actuates the film feeding mechanism and also a pinion 65 on shaft 66. This shaft also carries a gear wheel 67 having meshing engagement with pinion 68 on shaft 69 which is journalled in partition 12 and bracket 70 struck from the frame 13. Shaft 69 forms part of the governor mechanism for regulating the speed of the gearing just described.

As will be seen from Figure 4 the pinion 60 is provided with a groove receiving the cable 71 which runs to a pulley 73 fixed to shaft 24 and by which such shaft is caused to rotate for winding the film on the reel 23. On the end of shaft 66 opposite pinion 65 is a worm gear 74 meshing with gear 75 fixed to shaft 76, Figure 14, journalled for rotation in brackets 77 integral with partition 12. To the opposite end of this shaft is secured the shutter 78 rotating within recess 27 and in front of the exposure aperture 21.

The shaft 69, Figure 8, journalled at one end in bracket 70 bent from the member 13 and in the adjustable bearing 80 at its other end has the pinion 68 loosely mounted thereon and resiliently connected through the coil spring 81 with the frame members 82 of the centrifugal governor. The members are fixedly secured to the shaft and carry at their outer ends the rollers 83 eccentrically mounted for rotation within the frame members by pins 84. When the shaft 69 is rotated the rollers 83 will fly outwardly assuming a maximum outward position as shown in Figure 8 due to centrifugal action upon the eccentrically mounted rollers. The collar 85 mounted for axial movement on shaft 69 by the pin and slot connection shown in Figure 8, and which also causes rotation of the collar with the shaft, carries the friction plate 86 yieldingly held against rollers 83 by the coil spring 87. A supporting bracket 88 has secured thereto one leg of a U-shaped member 90, the other leg of which carries a stop 91. Located between the ends of the leg members is an adjusting block 92 mounted for rotation in bracket 88 and the supporting plate 93 secured thereto. As shown in Figure 10 block 92 has suitably secured to the various sides thereof projecting studs 94 of varying height in order to vary the position of stop 91 with respect to the friction plate 86. One end of block 92 is provided with a transverse groove 95 with which cooperates the indexing dial 96 rotatably mounted in the casing 10. By rotating block 92 any one of the projecting studs 94 can be brought into contact with the free leg of member 90 to vary the relative position of stop 91. Upon operation of the camera the frames 82 will rotate with the shaft 69 to cause outward movement of the eccentric rollers 83 and cause axial displacement of the friction plate 86 which likewise rotates with the shaft. Such axial displacement of the friction plate takes place against the tension of spring 87 so that when rotation stops the friction plate has movement in an opposite direction, being normally held in engagement with the frames 82. Contact between plate 86 and the stop 91 which takes place by reason of this axial displacement of the friction plate governs the speed of the camera mechanism and since the location of the stop can be varied through adjustment block 92 it will be seen from the above that the structure provides means for regulating the number of exposures being made in a given unit of time. The indicia 97 associated with dial 96 indicates to the operator the various speeds to be secured from a particular location of the dial.

The intermittent film feeding mechanism shown in Figures 15 and 16 is supported within the motor compartment and between the partition 12 and bracket 100 and consists of a pitman arm 35 and a pilot arm 37, previously mentioned, and driven from shaft 64 by mechanism to be now described. Shaft 64 is journalled in frame member 13 and bracket 100 and projects beyond the bracket toward partition 12, as shown in Figure 13, said projecting portion having mounted thereon a cam 101 and a disc 102 having a pin 103 eccentrically positioned thereon. The pitman arm 35 is pivoted at 103 eccentrically on disc 102 and has slidable connection with the fulcrum pin 104 fixed to bracket 100 through the arcuate slot 105 formed in the arm intermediate its pivot point 103 and the supplemental extension on said arm which is bent at its end to provide the claw 34, Figure 14. Rotation of shaft 69 imparts to the pitman arm compound motion, giving to the claw 34 a rectangular movement, that is, up and down and in and out movement, as is common in mechanism for intermittently feeding motion picture film across an exposure aperture. The pilot arm 37 is pivoted at 106 to the bracket 100 in spaced relation therewith and is bifurcated at its free end providing spaced extensions 107 which are positioned on the respective sides of the cam 101. A supplementary arm projects laterally from arm 37 being bent at its outer end to provide the pilot pin 36 which has movement within slot 33. The pin moves in and out of said slot to engage and disengage with perforations in the film, the movement being caused by the contour of cam 101, which, upon rotation of shaft 64 oscillates the spaced extensions 107, causing pivotal movement of the pilot arm on its pivot as will be clearly understood by reference to Figure 15.

In the present structure the claw 34 and pilot pin 36 have alternate in and out movement so that when the film is being advanced with respect to the exposure aperture by downward movement of the claw 34, during which movement the claw is disposed inwardly of its aperture 32 to engage with the perforations in the film, the pilot pin is located outwardly of its aperture or opening 33 and therefore is out of engagement with the film. Upon continued rotation of shaft 64 the claw will presently move outwardly, disengaging the film, and begin its upward movement. Before such movement takes place, however, the pilot pin has been located inwardly of its opening to engage with a perforation in the film, holding the film properly positioned with respect to aperture 21 for exposure. The positions of the film feeding mechanisms just described is shown in Figures 15 and 16.

The present camera is primarily designed for amateur use and it is therefore especially desirable that the operator have some means for determining the number of feet of film being exposed and also the amount of film remaining on the reel and unexposed. The invention accordingly provides a film footage indicator 108, Figure 2, which is located exteriorly of the casing 10 and has associated therewith the ratchet wheel 110, Figure 5. Suitably secured to frame 13 is a strip of spring metal 111 having an extension cut therefrom and bent to engage the notches in the ratchet wheel 110 in order to prevent rotation of said indicator in one direction but permitting rotation in the opposite direction. Pawl 112 is pivoted at 113 to the frame member 13 and has integrally formed therewith a pair of bifurcated arms, one having contact with the ratchet wheel 110 and being provided with a stop 114 and the other being positioned for contact with pin 115 extending from the ratchet wheel 55 forming part of the winding mechanism for the motor. Secured to pawl 112 is a resilient metal strip 116 having its outer end in contact with the supporting post 15 to hold stop 114 against an abutment provided by the frame member 13, in which position an arm of the pawl is located in the path of pin 115. When the camera is loaded with a full reel the indicator can be turned to show maximum footage on the roll. During operation of the camera in the act of taking pictures the pin 115 will engage the pawl 112 each revolution to rotate the indicator clockwise which will bring various numerical indicia in alignment with the indexing arrow to show the footage remaining at any time on the reel.

A starting and stopping lever 118 is pivoted at 119 to the frame member 13 and is provided with a bent end 120 adapted for contact with the shoulder provided on cam 121 which is fixed on shaft 66, as shown in Figure 5. Supported on the stud shaft 122 is a tension spring having oppositely directed tension members 123 and 124, respectively, the former engaging with the end of the lever opposite the bent portion 120 and resiliently urging said end in a direction to hold the portion 120 in engagement with cam 121. Member 124 is associated with a lug 125 formed on lever 118 in the vicinity of the end 120 and forms with said lug a stop to hold the lever in open position where the operator may remove his finger from the actuating button 126, and the mechanism will continue in operation. It is possible for the operator to release portion 120 from engagement with the shoulder on cam 121 to start operation of the mechanism without using the lug and when so positioned the lever will immediately spring back into engagement with the cam when the operator releases the button 126. As shown in Figure 4 the actuating button has operative connection with the lever 118 so that slidable movement of the button will rock the lever, causing engagement or disengagement with the cam as described.

A cover 128 suitably secured to the partition 12, as shown in Figures 4 and 6, encloses that portion of the governor mechanism which projects beyond the partition and in addition provides attaching means for the lock 130 mounted in the cover 11 of the camera casing. With this cover 11 removed the reels 17 and 23 are exposed, permitting location of the film between the exposure aperture and film gate 22 whereupon the cover is replaced and the camera is ready for taking pictures. The usual lens barrel 131 is secured to one side of the casing in alignment with the lens apertures 30 and 31, while on the side of the casing opposite the cover is mounted the view finder indicated in its entirety at 132.

From the above it will be seen that the camera of the invention is compact yet of sturdy construction, which, however, requires the minimum number of parts making for economy in manufacture. The winding of the spring type motor is noiseless due to the omission of the usual tension spring and since the structure has been reduced to a single element, namely, the arcuate pawl, its efficiency has been greatly increased as there are no parts to get out of order. The various elements making up the film gate and associated parts are also of sturdy construction having only one separable part, namely, the center pressure pad 47, which is removable by sliding the pad transversely of the gate. As previously stated, the pressure pad 45 opposite the film feeding claw exerts a greater tension on the film than does the pressure pad 46 although both are integral, being bent from the same base member having firm securement to the film gate. The film gate including the resilient member having the spring arms 39 operates to receive the film from the unwinding reel, to maintain the same properly tensioned against the exposure aperture and the mechanism operating to intermittently feed the film with respect thereto, and to yieldingly guide the film onto the take-up reel. These operations are accomplished efficiently at normal speeds as well as high speeds, it being understood that the governor of the present camera is capable of adjustment to permit a normal speed and also a high speed which is used when taking slow motion pictures.

It will be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a motion picture camera, in combination, spaced frame members, an operating motor located between said members, one of said frame members providing an exposure aperture and mounting film supporting reels, means operated by said motor for intermittently advancing the film past the exposure aperture, a film gate formed of spaced walls and hingedly carried by said frame member, the inner wall of said gate having a plurality of spaced cut-out portions, a member located within said gate and providing pressure pads adapted to project outwardly from said cut-out portions, said pads yieldingly holding the film for contact by the intermittent film feeding means.

2. In a motion picture camera, in combination, spaced frame members, an operating motor located between said members, one of said frame members providing an exposure aperture and mounting film supporting reels, means operated by said motor for intermittently advancing the film past the exposure aperture, a film gate formed of spaced walls and hingedly carried by said frame member, the inner wall of said gate having a plurality of spaced cut-out portions, a member located within said gate and providing pressure pads adapted to project outwardly from certain of the cut-out portions, and a central pressure pad having slidable movement within the other cut-out portion, whereby the film is yieldingly held against the exposure aperture and for contact by the intermittent film feeding means.

3. In a motion picture camera, including in combination, spaced frame members housing an operating motor, one of said frame members comprising a partition supporting film carrying reels, a member secured to said partition and providing an exposure aperture, means operated by the motor for intermittently feeding the film past the exposure aperture, a film gate associated with said aperture, resilient strips extending from the ends of said gate for engaging the film intermediate the gate and said reels, and an arcuate film guard secured adjacent one of said reels and adapted to engage the film between said reel and one of said resilient strips, said film being adapted to pass to the outside of the arcuate guard to maintain a large loop of said film to relieve the film feeding means of excessive loads and strains.

4. In a motion picture camera, in combination, frame members including a partition, said members being spaced from each other and housing an operating motor therebetween, shafts extending from each end of the partition at right angles thereto, one shaft being fixed and the other shaft being journalled by the partition, means connecting the journalled shaft with said motor, a member secured to said partition and providing an exposure aperture, means operating through a wall of said member and engaging the film to intermittently feed the film past the aperture, a film gate associated with said aperture, a film guard secured to the partition adjacent the fixed shaft, said film being adapted to pass to the outside of the guard to maintain a large loop of film, and resilient means provided by said gate for contacting the film between the guard and gate.

5. In a motion picture camera, in combination, frame members including a partition, said members being spaced from each other and housing an operating motor therebetween, a shaft extending from the partition at each end thereof and having a film supply and takeup reel thereon respectively, means withdrawing the film from the supply reel and intermittently feeding the film past an exposure aperture, and an arcuate rigid guard of substantial length fixed to said partition adjacent the supply reel, said guard being located to that side of the supply reel toward the film feeding means, and said film upon leaving the reel passing to the outside of the guard which thereby maintains a loop of slack film between the reel and said film feeding means.

6. In a motion picture camera, in combination, spaced frame members including a partition, an operating motor therebetween, an integral one-piece member secured to said partition, said member having spaced front and rear walls forming a recess in the member which is open on the side toward the partition, the rear wall having an exposure aperture therein and said front wall providing an opening for receiving a lens, means operated by said motor for intermittently feeding the film past the exposure aperture, said means including a claw arm extending within the recess through the opening thereof, and said claw arm operating through an opening in the rear wall of the member.

7. In a motion picture camera, in combination, spaced frame members including a partition, an operating motor therebetween, an integral one-piece member secured to said partition, said member having spaced front and rear walls forming a recess in the member which is open on the side toward the partition, the rear wall having an exposure aperture therein and said front wall providing an opening for receiving a lens, means operated by said motor for intermittently feeding the film past the exposure aperture, said means including a claw arm and a pilot pin arm extending within the recess through the opening thereof, the claw arm operating through an opening in the rear wall of the member below the aperture and the pilot pin operating through said rear wall above the aperture.

8. In a motion picture camera, in combination, spaced frame members including a partition, an operating motor therebetween, an integral one-piece member secured to said partition, said member having spaced front and rear walls forming a recess in the member which is open on the side toward the partition, the rear wall having an exposure aperture therein and said front wall providing an opening for receiving a lens, means operated by said motor for intermittently feeding the film past the exposure aperture, said means including a claw arm and a pilot pin arm extending within the recess through the opening thereof, said claw arm and pilot pin arm operating through openings in the rear wall of the member respectively, and means rotatably mounting a shutter so as to extend through the opening in the integral one-piece member and within the recess thereof.

9. In a motion picture camera, in combination, spaced frame members including a partition, an operating motor therebetween, an integral one-piece member secured to said partition, said member having spaced front and rear walls forming a recess in the member which is open on the side toward the partition, the rear wall having an exposure aperture therein and said front wall providing an opening for receiving a lens, means operated by said motor for intermittently feeding the film past the exposure aperture, said means including a claw arm and a pilot pin arm extending within the recess through the opening thereof, said claw arm and pilot pin arm operating through openings in the rear wall of the member respectively, a shaft journalled by brackets fixed to the partition and rotated by said motor, and a shutter fixed to said shaft and extending through the opening in the integral one-piece member and within the recess thereof.

10. In a motion picture camera, in combination, spaced frame members including a partition, an operating motor therebetween, an integral one-piece member secured to said partition, said member having spaced front and rear walls forming a recess in the member which is open on the side toward the partition, the rear wall having an exposure aperture therein and said front wall providing an opening for receiving a lens, means operated by said motor for intermittently feeding the film past the exposure aperture, said means including a claw arm and a pilot pin arm extending within the recess through the opening thereof, said claw arm and pilot pin arm operating through openings in the rear wall of the member respectively, a film gate hingedly carried by said partition for holding the film against the rear wall of said member, and a plurality of pressure pads carried by said gate for yieldingly contacting the film opposite the exposure aperture and adjacent the openings for the claw and pilot pin respectively.

LEWIS H. MOOMAW.